June 8, 1948. J. W. PEARSON 2,442,876
METHOD OF MAKING PRESSURE-SENSITIVE ADHESIVE SHEETING
Filed May 27, 1944
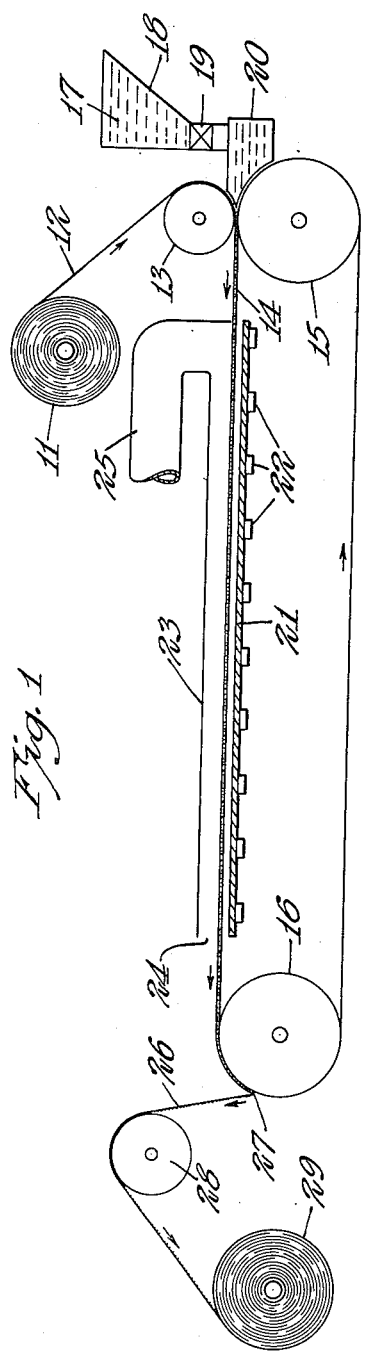
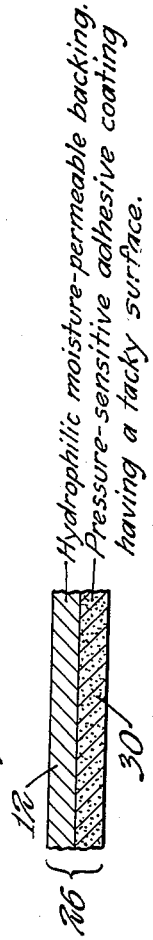
INVENTOR.
John William Pearson
BY
Carpenter, Abbott, Coulter, & Kinney
ATTORNEYS Patented June 8, 1948

2,442,876

UNITED STATES PATENT OFFICE 2,442,876

METHOD OF MAKING PRESSURE-SENSITIVE ADHESIVE SHEETING

John William Pearson, St. Paul, Minn., assignor to Minnesota Mining & Manufacturing Company, St. Paul, Minn., a corporation of Delaware Application May 27, 1944, Serial No. 537,657

4 Claims. (Cl. 117—112)

This invention relates to a method of making normally tacky pressure-sensitive adhesive sheeting having a hydrophilic moisture-permeable backing coated with a water-insoluble normally tacky pressure-sensitive adhesive deposited from an aqueous dispersion.

Pressure-sensitive adhesives such as are used in the manufacture of adhesive tapes, and which utilize rubber or rubbery synthetics as a basic ingredient, are normally applied to the fabric or other backing member as a solution in an organic solvent. Gasoline-type solvents are largely used for this purpose because of their relatively low cost, although other and more expensive solvents such as carbon tetrachloride have also been used, particularly where solvent recovery systems are practicable. Such solvents even when largely recovered and reused, add greatly to the cost of the coating operation, and many attempts have therefore been made to coat pressure-sensitive adhesive masses either in the dry state or from aqueous dispersion. Coating in the dry state, as on calender rolls, is satisfactory when using backings such as cloth, but is less useful on thinner or weaker backings such as treated paper, cellulosic films, and the like. On the other hand, water-dispersed adhesives cause extreme changes in physical dimensions and in tensile strength of hydrophilic backings, resulting in curling or tearing of the sheet during the coating and drying operations. While very thin coatings of water-dispersed or water-dissolved adhesive materials may be applied to such backings and dried immediately, as on steam-heated drums, without excessive wrinkling of the backing, this method is not readily applicable to the drying of thicker coatings; for example, the steam generated may cause blistering and puffing of the exposed adhesive surface. Furthermore, slow drying at lower temperatures, as in open racks or long tunnels, is not practicable because of the extensive curling and pronounced weakening of the backing, and the stickiness and smeariness of the wet adhesive coating. In addition, it is found that adhesive masses, which are tacky when deposited from organic solution, frequently become tack-free when deposited from aqueous dispersions.

I have now found that water-dispersed pressure-sensitive adhesives may be coated on hydrophilic moisture-permeable sheets or films (such as cloth, paper and regenerated cellulose films ("Cellophane")), and firmed by drying, to produce normally tacky and pressure-sensitive adhesive coated sheets or tapes without any loss of product by curling, tearing, or other similar distortion or change in the backing, or by reduction of tackiness of the adhesive. This result is accomplished by supporting the freshly-coated sheet or web backing on a moisture-impermeable temporary support which contacts the outer face of the adhesive coating, removing the aqueous vehicle through and from the exposed surface of the moisture-permeable backing, and subsequently stripping the dried composite adhesive sheet from the temporary support.

Objects of my invention are accordingly: to provide an improved method of coating aqueous dispersions of pressure-sensitive adhesives on hydrophilic moisture-permeable backings; to provide a method of coating aqueous dispersions of pressure-sensitive adhesives without appreciable reduction in tack; to produce pressure-sensitive adhesive coated sheets or tapes of improved properties and in an economical manner. Other objects will appear hereinafter.

A further description of my novel method of coating will now be made by reference to the drawings, in which Figure 1 is a diagram showing an illustrative system for the continuous making of pressure-sensitive adhesive coated sheeting according to the present invention, and Figure 2 is a representation in greatly enlarged cross-section of a pressure-sensitive adhesive sheet product produced thereby.

According to the system illustrated in Figure 1, a hydrophilic moisture-permeable sheet backing 12 (such as a Cellophane film) is unwound, under sufficient restraining tension to maintain smoothness thereof, from the supply roll 11, and is carried to and around adjustably mounted squeeze roll 13, where it is pressed against a polished metal endless belt 14 supported by roll 15, and is then carried along the surface of the metal belt. Roll 15, and its companion roll 16, serve to support the belt and to keep it taut; suitable means, not shown in the drawing, are provided to drive said rolls, and therefore the belt, at controlled speed in the direction indicated.

An aqueous dispersion of pressure-sensitive adhesive 17 is fed from supply hopper 18 through a suitable control valve 19 to coating hopper 20 which distributes the dispersion as a uniform film between the adjacent surfaces of the backing 12 and the metal belt 14, and at the same time prevents the dispersion from flowing out to or past the edges of said backing or belt. Squeeze roll 13, which presses the backing 12 towards the belt 14, is adjustable so as to control the thickness, and hence the weight per unit area, of the film of dispersed adhesive remaining between said belt and said backing.

The metal belt, carrying the moisture-permeable sheet backing together with the intercalated film of water-dispersed adhesive, then passes over metal plate 21 which is controllably heated by means of attached electrical strip-heaters 22, and through the drying duct formed by said plate 21 and a hood 23. Air is drawn into this duct at the open end 24, opposite the coating end, and along the moving back surface of the backing sheet, by means of a suitable exhaust fan, not shown, but which is connected to said drying duct through exhaust pipe 25; there is thus obtained a flow of air through the duct, counter to the direction of travel of the metal belt.

Passage of belt 14, and attached backing 12, with the intercalated film of adhesive, across heated metal plate 21 and through the air stream accomplishes the removal of the moisture content of the aqueous dispersion of said adhesive through, and from the exposed surface of, the hydrophilic moisture-permeable backing, with accompanying firming of the adhesive film. There is thus produced a pressure-sensitive adhesive coated sheet 26, shown also in Figure 2, comprising backing sheet 12 and dried adhesive film 30, in adhesive contact with metal belt 14. Adhesive sheet 26 is then stripped from the metal belt 14 along a line essentially parallel to the axis of drum 16, as is indicated at 27 in Figure 1. Stripping is accomplished by means of tension applied by pull drum 28, which is adjustably driven so that the angle formed between that portion of coated sheet 26 which is in contact with the belt 14 just prior to removal, and that portion which has just been stripped from said belt, is between about 30 and 90 degrees.

The coated sheet 26 is removed from pull drum 28 by tension applied by wind-up roll 29, on which the sheet is wound to form a stock roll, which latter may subsequently be slit and wound into rolls of tape ready for use.

Stripping of the coated and dried sheet from the belt is preferably carried out, as mentioned, so that the detached portion makes an angle with the still attached portion of the sheet, i. e., with the tangent drawn to the belt at the point of removal 27, of between 30 and 90 degrees. These limits are not critical. However, an increased angle increases the ratio of tension on the web to stripping tension, and may result in excessive or uneven stretching of the backing, wrinkling of the coated sheet on the pull drum and in the final roll, slipping or scuffing of the adhesive on the pull drum, and transfer of adhesive from backing to belt. A decreased angle is sometimes desirable in preventing adhesive transfer, but also may result in excessive crinkling of the coated backing, tearing or shearing at the edges of the backing, lamination of certain types of backings, and high removal effort. These faults become increasingly apparent as the thickness of the backing is increased.

Various modifications of the system as outlined under Figure 1 may be made without departing from the scope of my invention. For example, the electrical heating elements may be replaced by steam coils or even by direct-fired heating means, such as gas burners; the heat may be applied through an intermediate distributing means such as metal plate 21, or directly to the metal belt. Heat intensity at different points may be so regulated as to provide for different rates of drying at such points throughout the heated area. Indirect heating of the coated sheet may be used, as by preliminarily heating the air before drawing it past the sheet.

Instead of utilizing only half the total length of the metal belt 14, as indicated in Figure 1, essentially the entire length may be used, for example by stripping the coated and dried sheet from the belt just before it reaches the coating hopper. In this case, the entire belt, except for that portion in contact with the supporting roll 15, may be enclosed in a suitable oven or otherwise subjected to heating and drying conditions. Cooling of belt 14 prior to removal of coated sheet 26, for example by internal cooling of roll 15 by circulation of cold water, may prove desirable in order to firm up the adhesive before attempting to strip the coated sheet from the belt.

The use of a coating hopper, such as hopper 20 of Figure 1, is of advantage particularly in the coating of fluid or watery dispersions. For heavy, viscous or doughy type dispersions of higher solids content, such a hopper may not be required. Adjustable side plates or guides which closely follow the contour of both squeeze roll 13 and supporting roll 15 are then sufficient to prevent crawling of the adhesive mass to the edges of the web and thence to the reverse surfaces of metal belt and backing member. These heavy dispersions may be applied directly to the space between belt and backing, as by means of a dipper or paddle; their high viscosity, and the forward motion of the belt, is then sufficient to level out the bank of dispersion and to hold it in place. The coating of dispersion may be applied either to the casting belt or to the backing member alone, prior to their being brought together in sandwich relation. For example, a coating roll or rolls may be used to transfer the dispersion from a suitable supply trough to the belt as it passes around supporting roll 15, or to the backing as it passes around squeeze roll 13.

Any suitable metal, such as bronze, stainless steel, or the like, may be used in constructing the metal casting belt 14. The casting surface may be smooth and polished, and may for example be a plated surface; chromium plate is highly satisfactory. Certain wax, lacquer, or other finishes may likewise be used where desired, in order to obtain reduced adhesion value between the belt and the adhesive coated sheet. In some cases it may be desirable to impart certain designs or irregularities to the adhesive surface; the use of belts preformed with such surface designs or irregularities is therefore contemplated in my invention. While metal belts are to be preferred because of their permanence, high strength, and high heat conductivity, other suitable materials of construction may also be used where desired for certain specific properties.

It will be obvious that a single cylindrical drum may be used in place of the flexible metal belt where desired. The drum must be of sufficient circumference, and must be operated at such restricted speed, as to allow of complete drying of the composite web in somewhat less than one revolution. The shell of the drum should be relatively thin so as to be easily and rapidly heated and cooled as required in drying the web and in stripping the finished product from the drum surface.

It will also be apparent that a moisture-impermeable flexible casting web may be used in place of the flexible metal belt 14 of the diagram. An example is a tough paper web having a moisture-impermeable surfacing adapted to permit of stripping away the dried adhesive sheeting, which may be provided by a suitable hydrophobic film coating or by a laminated metal foil, for example. Such a web may be drawn from a suitable supply roll to and around supporting roll 15 and beneath squeeze roll 13, where it is combined with the aqueous dispersion 17 from hopper 20 and the moisture-permeable sheet backing 12 from supply roll 11. The composite, consisting of casting web, backing, and intercalated film of dispersion, may then be dried in any suitable way and for any suitable length of time, as by supporting on racks in an oven or passing over a series of heated drums, after which it may be passed around a suitable supporting drum and the adhesive-coated backing stripped from the casting web; the latter may then be rewound and returned to the coating machine for further use.

While in general any suitable water-dispersed water-insoluble normally tacky pressure-sensitive tape adhesive may be applied to any suitable moisture-permeable sheet backing by the method of my invention, I will now describe in detail a preferred composition which may be used in the manufacture of a thin transparent normally tacky pressure-sensitive adhesive tape useful as a sealing or packaging tape and having a crude rubber base adhesive and a regenerated cellulosic film backing.

Example

| | Parts by weight |
|---|---|
| Hydrogenated coumarone-indene resin such as Nevillite resin of 150° C. melting point, sold by the Neville Co., Pittsburgh) | 400 |
| Pale gum rosin | 80 |
| Liquid paraffin oil | 360 |
| Latex milk (60% rubber) | 1,400 |
| Antioxidant (such as "Flectol B," a condensation product of acetone and aniline sold by the Rubber Service Laboratories Division of Monsanto Chemical Co.) | 2 |
| Casein solution (24% casein) | 164 |
| Potassium hydroxide solution (50% KOH) | 30 |
| Water | 150 |

The casein solution is made by mixing 900 parts of powdered casein in 2700 parts of water containing 90 parts of pentachlorphenol ("Dowicide G," a germicide sold by Dow Chemical Co.) to produce a uniform slurry, and adding 45 parts of concentrated ammonium hydroxide to the slurry in order to obtain solution of the casein.

In preparing the dispersion of adhesive, the Nevillite resin, gum rosin, and paraffin oil are first blended together by heating and mixing. This blend is then transferred to a heavy duty internal mixer, such as a Baker-Perkins Universal mixing and kneading machine, where it is cooled by running cooling water through the jacket of the mixer. One hundred parts of water are then added and allowed to mix in, followed by 100 parts of latex milk. The rubber content dissolves in the resin-oil mixture, and there is produced a tough, "snappy" water-in-oil type dispersion. The antioxidant is also added at this point.

The casein solution, which is smooth but extremely viscous, is now added slowly and with continued mixing, with the temperature of the batch maintained at not higher than about 60° C. As soon as all of the casein solution is uniformly mixed in, the potassium hydroxide solution is added in small increments; continued mixing then causes the dispersion to invert to the oil-in-water type, after which the balance of the water and of the latex milk is added and stirred in. The final dispersion is stiff and viscous; it may be further diluted and thinned with additional water where desired.

The dispersion of the above example may be coated and dried on a film of regenerated cellulose such as "Cellophane", by the method of this invention, to produce a useful normal tacky pressure-sensitive adhesive coated sheet or tape.

In place of all or part of the casein, various other hydrophilic colloidal agglutinants may be used: examples are polyvinyl alcohol, isinglass, gelatine, soy bean protein glues, "Mazein" (corn prolamine), dextrin, methyl cellulose, water-soluble polyhydric-alcohol/polybasic-acid resin, urea-aldehyde resin, water-soluble alkyd resin salt, or mixtures thereof. These materials act as protective colloids and ass it in forming the dispersion; in addition, they afford a means of obtaining a firm bond to the hydrophilic moisture-permeable backing.

Natural latex has been specified in the example; it is to be understood that various synthetic latices may be substituted. A particular advantage of my improved method over prior art methods employing organic solvents is that insoluble or difficulty soluble adhesive bases may be employed. Thus, vulcanized rubber, or cross-linked acrylate ester polymers, or highly esterified alkyd resins, may be used as base materials for water-dispersed adhesives which may be satisfactorily coated by the method of my invention, whereas these same materials would either be in soluble in organic solvents, or would require excessive amounts or expensive and less readily available types of these solvents.

Since my novel method includes provision for heating the coated product to any desirable temperature and over any desirable area, it is also possible to coat partially reacted heat-reactive adhesives and to complete the reaction by further heating in contact with the casting belt prior to stripping of the coated sheet therefrom. For example, dispersions of vulcanizable mixtures of soft rubber or soft synthetic rubber, which mixtures may be converted to eucohesive pressure-sensitive adhesives (e. g., to adhesives which are more cohesive than adhesive, but still tacky) by heating, may be applied between the casting belt and a suitable backing member, the aqueous vehicle removed through the backing, and the residual mixture vulcanized to the eucohesive, pressure-sensitive adhesive stage by further application of heat through the casting belt. In the same way, dispersions of suitable incompletely condensed alkyd resins, suitably compounded with desired modifying agents, may be coated and further reacted to the eucohesive, pressure-sensitive stage.

Regenerated cellulose ("Cellophane") film has been mentioned as a preferred example of a hydrophilic moisture-permeable backing member to be used in the production of pressure-sensitive adhesive tape or sheets by my novel method. Other examples of hydrophilic moisture-permeable films are films of hydrophilic cellulose ethers, including hydroxy alkyl cellulose ethers (such as hydroxy ethyl cellulose), methyl cellulose, and special water-soluble types of ethyl cellulose; films of plasticized starch; protein films, such as those made of gelatin, casein, or "Mazein" (corn prolamine); and films of polyvinyl alcohol. Hydrophilic moisture-permeable cloth, paper, and treated paper backings may also be used. For example, absorbent creped sulfate Kraft paper unified with flexibilized glue, as described in U. S. Patent No. 1,760,820, issued to R. G. Drew, may be used. Tissue papers may be used.

There is also contemplated herein the simultaneous impregnation or treatment of a porous fibrous backing member and application of adhesive coating. Porous paper previously sized on one surface or impregnated for a portion of its thickness with a suitable moisture-permeable treating agent such as plasticized glue, subsequently regenerated viscose, or the like, may be coated on the untreated surface with a suitable water-dispersed adhesive according to the method of my invention, even though the treated sheet alone may be too weak, when in contact with the aqueous dispersion, to withstand any appreciable tension such as is necessarily encountered in more conventional coating methods. Similarly, untreated porous fibrous webs may be completely or partially saturated with the dispersed adhesive, which when dried unifies and strengthens the fibrous web and in addition provides a tacky surface coating. Any undesirable tackiness which may appear on the outer or back surface of such construction may be masked by spray or roll application of lacquer, or by means of an adhesively applied preformed cellulosic film, or by other suitable means, applied either before or after removal of the coated web from the casting belt. A particularly useful product may, for example, be comprised of a porous tissue paper having a thickness of approximately one thousandth of an inch, coated and saturated with the water-dispersed adhesive of the Example as previously described, and an outer backing member of regenerated cellulose film. In producing such a construction, the paper web may be introduced, by means of suitable guiding rolls, through the coating hopper 20 of Fig. 1. A still simpler method involves the vertical arrangement of the casting belt, in which case squeeze roll 13 and supporting roll 15 are side by side in a horizontal position and thus, together with suitable side plates or guides as previously mentioned, effectively form a hopper or trough into which the dispersion may be poured and through the center of which the porous paper web may be guided by suitable external rolls. Other modifications will be apparent.

Water dispersions of pressure-sensitive adhesives which contain hydrophilic colloidal agglutinants (such as casein), will normally dry, when exposed to the atmosphere, to a tack-free condition. However, as hereinbefore noted, I have found that drying of such dispersions under the conditions imposed by the method of my present invention produces a tacky, pressure-sensitive adhesive surface in contact with the casting belt. "Self-priming" of the adhesive on the moisture-permeable hydrophilic backing is also obtained, particularly when using more dilute and therefore less viscous dispersions; that is, the dried adhesive film is found to have improved anchorage to the surface of the backing with which it is in contact during drying. This effect is considered to be due to the ability of the aqueous dispersion to wet the hydrophilic backing, and also to the presence of the hydrophilic colloidal agglutinant. "Self-priming" may in many cases be sufficient to prevent transfer or stripping of the dried adhesive film from the backing when the finished sheet or tape is unwound from the pull drum, stock roll, or finished tape roll. Where the "self-priming" effect is for any reason insufficient for this purpose, a previously primed backing may be used. For example, "Cellophane" may be preliminarily sized or primed with a casein-latex primer solution (such as is described in U. S. Patent No. 2,328,066, issued August 31, 1943, to R. G. Drew), followed by drying to form a thin casein-rubber primer coating. Such a primer permits the passage of moisture vapor, while still remaining insoluble, an also effectively increases the bond between the "Cellophane" backing and the pressure-sensitive adhesive layer. In this case, a rubber base pressure-sensitive adhesive such as is described in the Example is preferably used. Other adhesives may be used with other moisture-permeable priming compositions.

By means of the method of the present invention the following advantages are obtained:

1. Backing members which are initially extremely low in tensile strength may be readily coated without tearing or breaking.

2. Backing members which become extremely low in tensile strength on exposure to water present in the coating material may be readily coated with such material without tearing or breaking.

3. The backing member is held in a flat, fully extended position during drying and/or curing of the coating material, and the coated sheet product is thus obtained without loss by curling or wrinkling.

4. Water-dispersed adhesive may be applied and dried successfully in desirably thick films without blistering or bubbling.

5. Water-dispersed adhesives may be used which, if dried by direct exposure to the air, would yield a non-tacky surface.

6. Self-priming of the backing by the water-dispersed adhesive is obtained.

Having disclosed various embodiments of my invention, for purposes of illustration rather than limitation, what I claim is as follows:

1. In a method of making normally tacky pressure-sensitive adhesive sheeting having a hydrophilic moisture-permeable backing, the steps comprising feeding the hydrophilic moisture-permeable backing upon a moving casting support having a moisture-impermeable surface, applying an aqueous dispersion of water-insoluble normally tacky pressure-sensitive tape adhesive composition to form a coating lying between said backing and the casting support surface in sandwich relation, said coating holding the backing parallel to the casting support surface to prevent distortion, moving the backing and casting support through a drying zone and allowing moisture in the coating to be removed through the backing to dehydrate the coating, and stripping the adhesive coated backing from the said casting support.

2. In a method of making normally tacky pressure-sensitive adhesive sheeting having a hydrophilic moisture-permeable film backing, the steps comprising feeding the hydrophilic moisture-permeable film backing upon a moving casting support having a moisture-impermeable surface, applying an aqueous dispersion of water-insoluble normally tacky pressure-sensitive tape adhesive composition to form a coating lying between said backing and the casting support surface in sandwich relation, said coating holding the backing parallel to the casting support surface to prevent distortion, moving the backing and casting support through a drying zone and allowing moisture in the coating to be removed through the film backing to dehydrate the coating, and stripping the adhesive coated backing from the said casting support.

3. In a method of making normally tacky pressure-sensitive adhesive sheeting having a hydrophilic moisture-permeable regenerated cellulose film backing, the steps comprising feeding the hydrophilic moisture-permeable regenerated cellulose film backing upon a moving casting support having a moisture-impermeable surface, applying an aqueous dispersion of water-insoluble normally tacky pressure-sensitive tape adhesive composition to form a coating lying between said backing and the casting support surface in sandwich relation, said coating holding the backing parallel to the casting support surface to prevent distortion, moving the backing and casting support through a drying zone and allowing moisture in the coating to be removed through the regenerated cellulose film backing to dehydrate the coating, and stripping the adhesive coated backing from the said casting support.

4. In a method of making normally tacky pressure-sensitive adhesive sheeting having a hydrophilic moisture-permeable film backing, the steps comprising feeding the hydrophilic moisture-permeable film backing upon a moving casting support having a moisture-impermeable surface, applying an aqueous dispersion of water-insoluble normally tacky pressure-sensitive tape adhesive composition containing a hydrophilic colloidal agglutinant to form a coating lying between said backing and the casting support surface in sandwich relation, said coating holding the backing parallel to the casting support surface to prevent distortion, moving the backing and casting support through a drying zone and allowing moisture in the coating to be removed through the backing to dehydrate the coating, and stripping the adhesive coated film backing from the said casting support.

JOHN WILLIAM PEARSON.

REFERENCES CITED

The following references are of record in the file of this patent:

UNITED STATES PATENTS

| Number | Name | Date |
|---|---|---|
| 1,776,141 | Bibb | Sept. 16, 1930 |
| 2,029,273 | Montgomery | Jan. 28, 1936 |
| 2,267,470 | Kabela | Dec. 23, 1941 |
| 2,275,957 | Graff | Mar. 10, 1942 |
| 2,304,818 | Grupe | Dec. 15, 1942 |
| 2,304,819 | Grupe | Dec. 15, 1942 |